United States Patent Office 3,523,603
Patented Aug. 11, 1970

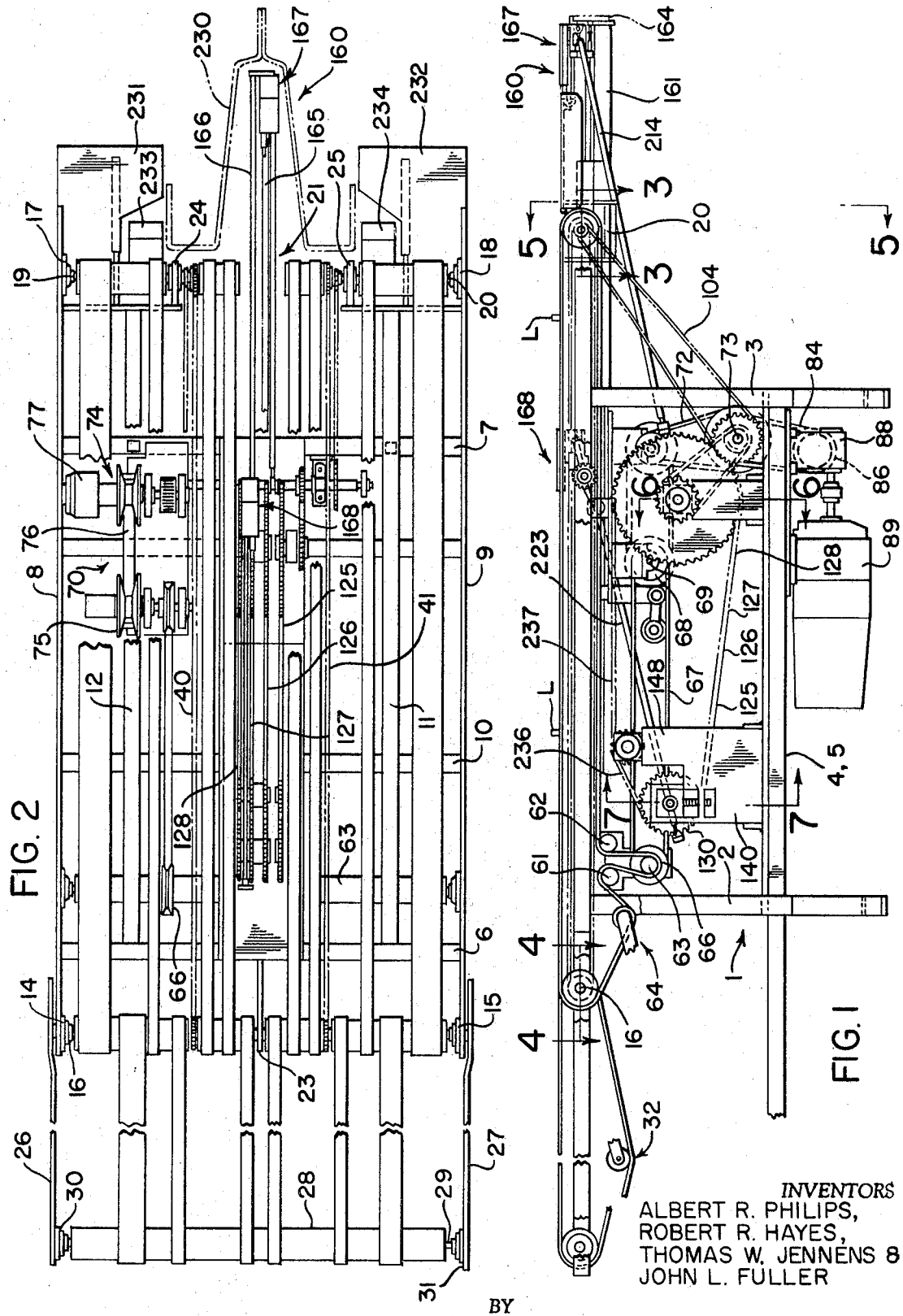

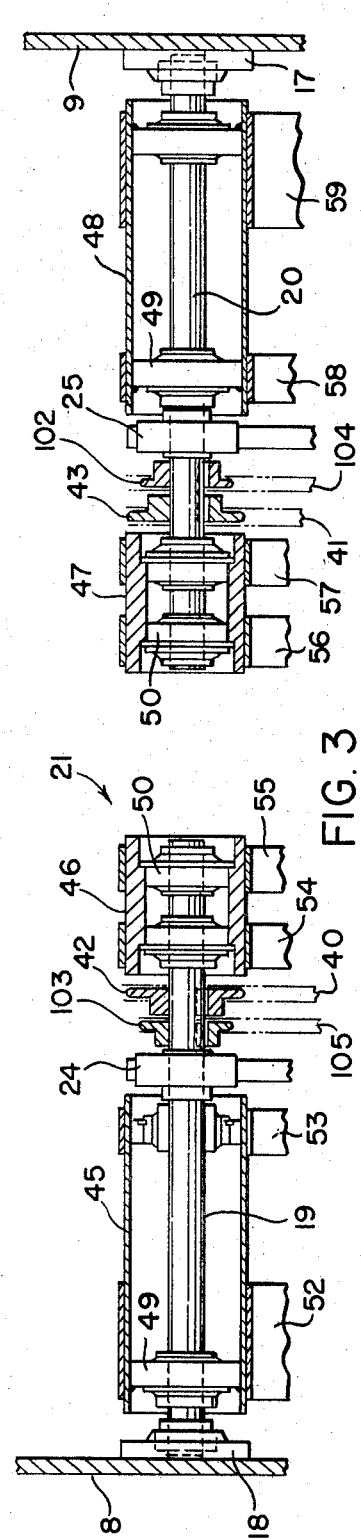

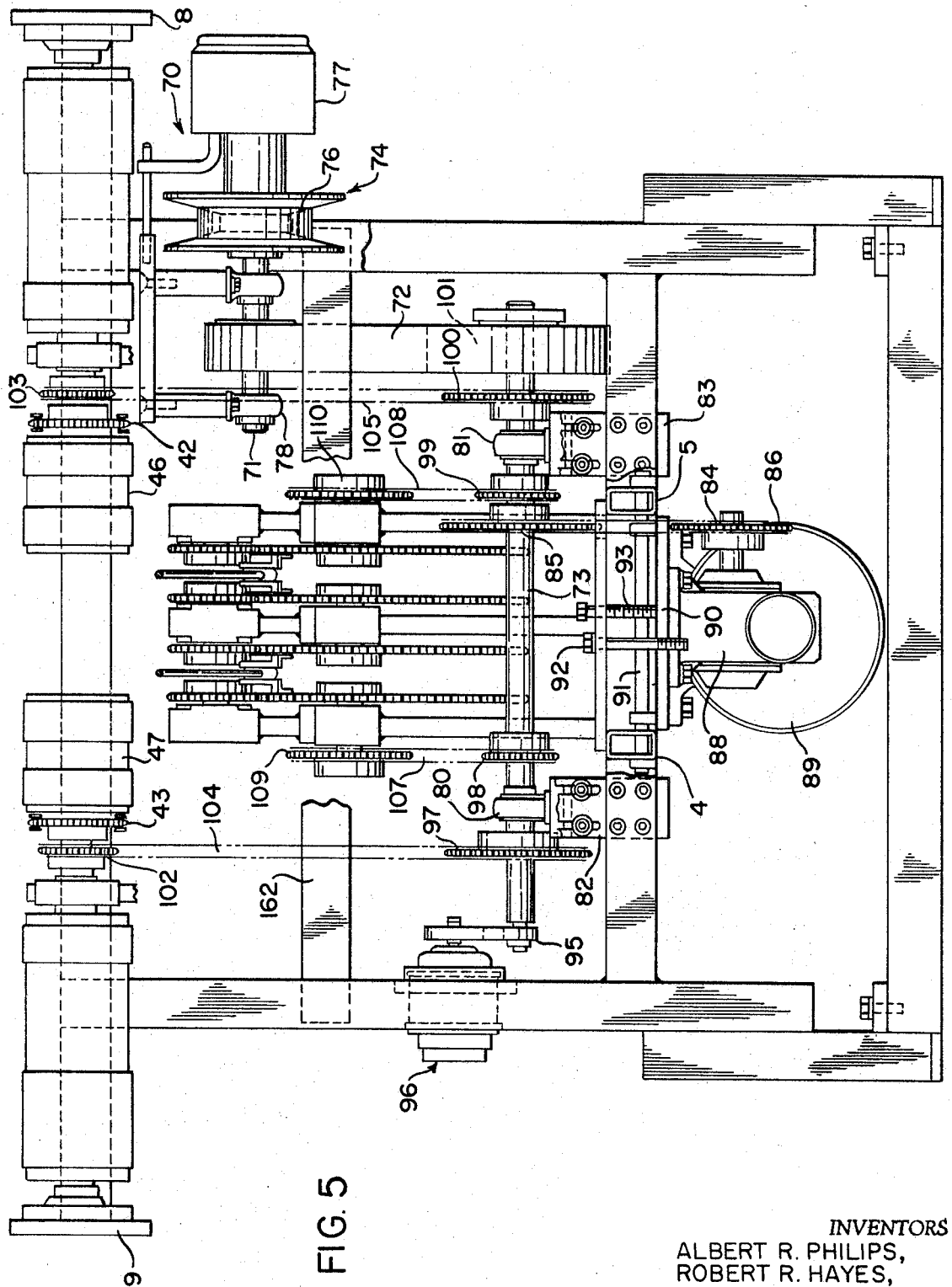

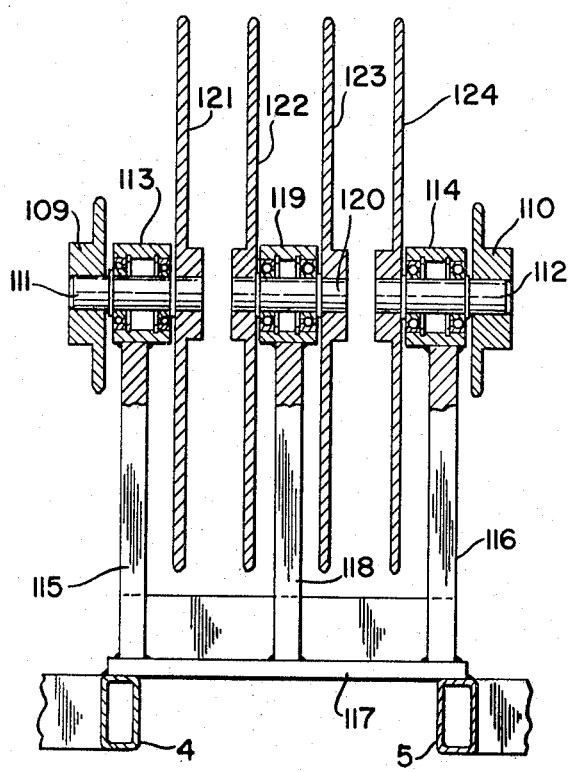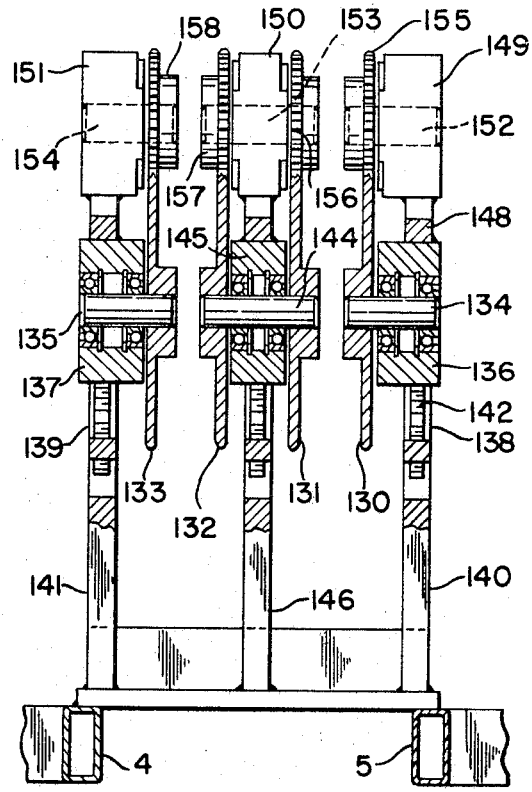

3,523,603
CONVEYOR TABLE
Albert R. Philips, Cleveland, Robert R. Hayes, Euclid, Thomas W. Jennens, Eastlake, and John L. Fuller, Shaker Heights, Ohio, assignors to Bangor Punta Operations, Inc., Bangor, Maine, a corporation of New York
Filed Aug. 11, 1967, Ser. No. 659,928
Int. Cl. B65g 37/00; B65h 29/68
U.S. Cl. 198—76
31 Claims

ABSTRACT OF THE DISCLOSURE

A sheet feed conveyor table for placing sheets in wicket conveyors and the like including a lug drive chain for spacing the sheet on such table and driving it therealong with a positive placement device for transferring the sheet from the end of the table into position to be picked up by the wicket conveyor, the device comprising vacuum sheet gripping shoes reciprocating to and from pick up and release position, drive means for the shoes moving the same initially at the speed of the sheet and then at an accelerated speed and finally decelerating the shoe to the release position at which the vacuum is vented; and a piston-cylinder assembly connected to each shoe for creating the vacuum.

DISCLOSURE

This invention relates generally as indicated to a conveyor table and more particularly to a sheet feed conveyor table for placing sheets in wicket conveyors and the like with a positive placement.

Heretofore, conveyor tables for feeding individual sheets to wicket conveyors for subsequent transfer through furnaces and the like have simply accelerated the sheet into the wicket sometimes banging the edge thereof against the wicket brackets and this often results in edge damage to the sheet. This is a particular problem when the sheet is coated. To avoid this damage, magnetic or other types of brakes have been provided adjacent the wickets in an effort to control the positioning of the sheet with respect to the wicket, but this requires a substantial amount of frictional drag with may also be injurious to the sheet and does not necessarily guarantee positive placement.

With the present invention, the individual sheets are under positive control until released precisely in position to be picked up by the wicket conveyor and accordingly the sheets may be positioned without edge damage and without excessive frictional drag. Moreover, the positive placement of the sheets ensures the proper positioning of the sheets with respect to the wicket conveyor.

It is accordingly a principal object of the present invention to provide a feed table for wicket conveyors and the like which will positively place the sheet with respect to the wicket conveyor.

Another principal object is the provision of a positive placement conveyor for individual sheets which will maintain position control of the sheets at all times.

Another object is the provision of a sheet transfer conveyor which will synchronize the delivery or removal of sheets from a wicket conveyor and the like.

A further object is the provision of a sheet transfer conveyor obviating the requirement for sheet retarding devices which may tend to damage the edges or mar the surfaces of such sheet.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation of a conveyor table in accordance with the present invention;

FIG. 2 is a top plan view, partially broken away, of the table seen in FIG. 1;

FIG. 3 is an enlarged horizontal section taken substantially on the line 3—3 of FIG. 1;

FIG. 4 is an enlarged horizontal section similar to FIG. 3 taken substantially on the line 4—4 of FIG. 1;

FIG. 5 is an enlarged end elevation, partially broken away, of the table taken substantially on the line 5—5 of FIG. 1;

FIG. 6 is an enlarged fragmentary vertical section taken substantially on the line 6—6 of FIG. 1;

FIG. 7 is a similar vertical section taken substantially on the line 7—7 of FIG. 1;

FIG. 8 is an enlarged side elevation partially broken away of the transfer mechanism;

FIG. 10 is an end elevation of the transfer mechanism taken substantially on the line 10—10 of FIG. 8;

FIG. 11 is a fragmentary side elevation on a somewhat reduced scale illustrating the support for the transfer mechanism and one of the piston-cylinder assemblies secured thereto;

FIG. 12 is an end elevation taken substantially on the line 12—12 of FIG. 11.

Figure 13:
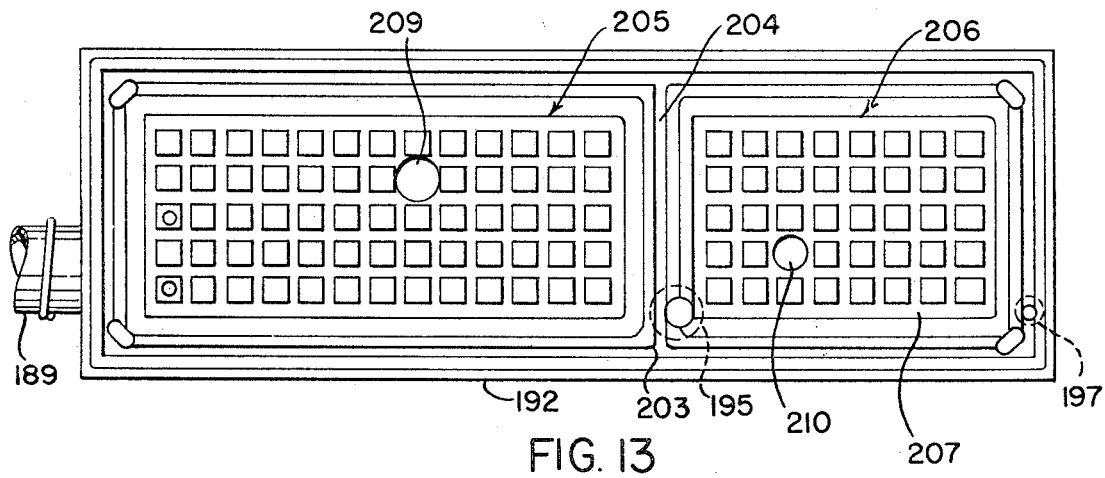
FIG. 13 is an enlarged top plan view of the sheet gripping shoe of the transfer mechanism with the plastic sheet engaging fillet removed.
Figure 9:
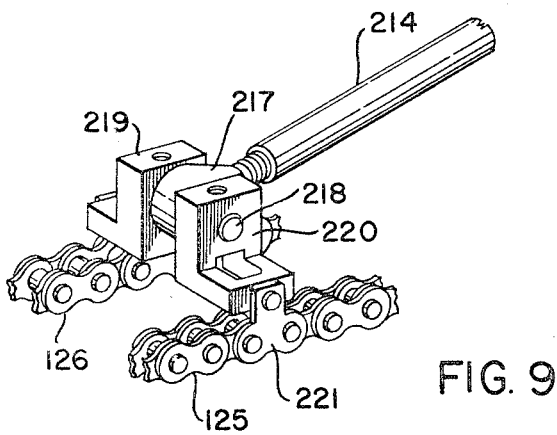
FIG. 9 is a fragmentary perspective view of the drive connection for such transfer mechanism.

Referring now to the annexed drawings and more particularly to FIGS. 1 and 2, there is illustrated a conveyor feed table in accordance with the present invention which is supported on stand 1 which includes pairs of legs 2 and 3 at each end with tubular frame members 4 and 5 extending longitudinally of the table near the lower end thereof. At the upper end, the legs support cross frame members 6 and 7, the latter may actually comprise two aligned laterally spaced members. Such cross frame members at their ends support side plates 8 and 9 and additional cross frame members may be provided as indicated at 10, such cross frame members being interconnected by longitudinal members seen at 11 and 12.

The side plates 8 and 9 may be provided at the rear end with pillow blocks 14 and 15 supporting shaft 16 and at the front with pillow blocks 17 and 18 supporting the ends of shafts 19 and 20, respectively. These shafts, the belt sheaves and sprockets supported thereby are seen in more detail in FIGS. 3 and 4. The shaft at the discharge end of the conveyor is thus actually two shafts providing an opening or throat 21 therebetween. The shaft 16 is also journalled at its center as indicated at 23 while the shafts 19 and 20 are journalled at their inboard ends as shown at 24 and 25, respectively, with such journals being supported from the stand framing.

A conveyor extension at the entry end of the table is provided by side frames 26 and 27. A single long belt sheave 28 is secured to shaft 29 journalled in pillow blocks 30 and 31 mounted on the inner sides of the ends of the side frame extensions 26 and 27. A total of six belts is trained about the sheave 28 and the sheaves on the shaft 16 and belt tensioners indicated at 32 are provided for each belt.

As seen more clearly in FIG. 4, the shaft 16 is provided with a total of four belt sheaves as seen at 33, 34, 35 and 36 with the two inner sheaves 34 and 35 being somewhat shorter than the outer sheaves 33 and 36. Each of the sheaves is journalled on the shaft by means of sleeve bearings at each end thereof as indicated at 37. The shaft 16 is also provided with sprockets 38 and 39 secured thereto for rotation therewith, which may be identical in form, about which are trained lug chains 40 and 41. Such chains also extend about sprockets 42 and 43 keyed to the shafts 19 and 20 as seen in FIG. 3. The chains 40 and 41 are provided with outwardly projecting horizontally aligned lugs L, seen in FIG. 1, which will project slightly above the belt surface to engage the leading edge of the sheet material to space the same along the table from left to right as seen in FIGS. 1 and 2.

Referring again to FIG. 3, the shafts 19 and 20 are provided with belt sheaves 45, 46, 47 and 48 with the outboard sheaves 45 and 48 being somewhat longer than the inboard sheaves 46 and 47. The outboard sheaves are journalled on the shafts 19 and 20 by sleeve bearings at each end thereof indicated at 49 while the inboard sheaves 46 and 47 may be journalled on the shafts by means of roller bearings indicated at 50.

Reading from left to right in FIGS. 3 and 4, belts 52, 53, 54, 55, 56, 57, 58 and 59 are trained about the sheaves with the outboard belts 52 and 59 being somewhat wider than the other belts. The belts 52 and 53 are trained about the sheaves 33 and 45, while the belts 54 and 55 are trained about the sheaves 34 and 46. The belts 56 and 57 are trained about the sheaves 35 and 47 while the belts 58 and 59 are trained about the sheaves 36 and 48.

On the lower side of the table, the belts 52 through 59 also pass about idler sheaves 61 and 62 and between such sheaves about belt drive sheave 63. Belt tensioning and aligning devices are provided as indicated at 64. The belt drive sheave 63 is provided with a pulley 66 and drive belt 67 connects such pulley with pulley 68 on the output shaft 69 of variable speed transmission 70. The input shaft 71 of the transmission 70 is driven by timing belt 72 from jack shaft 73 seen in greater detail in FIG. 5. The input shaft 71 drives the output shaft 69 through the variable pitch pulleys 74 and 75 by means of belt 76. The pulley 75 may be spring loaded while the pitch of the pulley 74 may be manually controlled through command unit 77.

By means of the transmission 70, the belts can be driven somewhat faster than the lug chains 40 and 41 so that the sheets will be maintained in contact with the lugs. In this manner, the sheets are spaced and timed by the trailing edge of the lugs in contact with the leading edge of the sheet. When such contact is obtained, the belts slip beneath the sheets. In this manner, the sheets are gauged by the leading edge rather than the back edge and this obviates a necessity of complex timing changes should sheet sizes change.

As indicated in FIG. 5, the input and output shafts of the transmission 70 may be supported by pillow blocks 78 as seen in FIG. 5. Still referring to FIG. 5, it will be noted that the jack shaft 73 is supported on pillow blocks 80 and 81 adjustably supported on brackets 82 and 83, respectively. The jack shaft is driven by chain 84 trained about sprocket 85 on the jack shaft and sprocket 86 on the output shaft 87 of worm gear reducer 88 which is in turn driven by variable speed drive motor 89. The drive unit which includes both the motor and the reducer is mounted on the underside of plate 90 which is pivotally supported on shaft 91 extending between the longitudinal frame members 4 and 5. Pivotal adjustment of the plate 90 and thus the tension of chain 84 is obtained by screws 92 and 93 with the former being threaded through the plate and the latter simply abutting the plate.

Reading from left to right in FIG. 5, the jack shaft is provided with a timing belt sprocket 95 driving Selsyn unit 96, sprocket 97, sprocket 98, drive sprocket 85, sprocket 99, which may be the same as sprocket 98, sprocket 100, which may be the same as sprocket 97, and sprocket 101 for timing belt 72 driving the variable speed transmission 70. The sprockets 97 and 100 drive sprockets 102 and 103, respectively, mounted on shafts 20 and 19, respectively, as seen also in FIG. 3. This drive is afforded through chains 104 and 105.

The sprockets 98 and 99 drive through chains 107 and 108 sprockets 109 and 110, respectively, which are mounted on shafts 111 and 112 seen more clearly in FIG. 6. Such shafts are journalled in hubs 113 and 114 secured to stanchions 115 and 116 mounted on platform 117 extending between the longitudinal frame members 4 and 5. A center stanchion 118 also supports a hub 119 having shaft 120 journalled therein. Large diameter sprockets 121, 122, 123 and 124 are secured to the inner end of the shaft 111, both ends of the shaft 120 and the inner end of the shaft 112, respectively. These large diameter sprockets have chains 125, 126, 127 and 128 trained thereabout. Such chains also extend about vertically adjustable idler sprockets 130, 131, 132 and 133, respectively. The sprockets 130 and 133 are mounted on the inner ends of stub shafts 134 and 135 journalled in hubs 136 and 137 which may be supported for vertically adjustable movement in windows 138 and 139 in stanchions 140 and 141. Vertical adjustment may be obtained by screw jacks such as indicated at 142 or other suitable means.

The two sprockets 131 and 132 are mounted on the opposite ends of shaft 144 journalled in hub 145 vertically adjustably mounted on stanchion 146 which is positioned intermediate the stanchions 140 and 141 as seen in FIG. 7. Such stanchions each include forwardly upwardly projecting portions indicated at 148 on which are mounted hubs 149, 150 and 151 in which are journalled stub shafts 152, 153 and 154 supporting in similar manner the sprockets 155, 156, 157 and 158 which are aligned with the sprockets 130, 131, 132 and 133 which, of course, are also aligned with the sprockets 121, 122, 123 and 124.

The apparatus above-described including the chains 125 through 128 and their supporting drive sprockets comprises the drive mechanism for the transfer assembly of the present invention which is indicated generally at 160 in FIGS. 1 and 2 and illustrated in greater detail in FIGS. 8 through 13.

Referring first to FIGS. 11 and 12, it will be seen that a longitudinal frame member 161 is supported in the throat 21 of the table on stanchions from cross frame member 162 shown broken away in FIG. 3. Stanchions 163 and 164 are secured to each end of the frame member 161. Such stanchions at their upper ends support laterally spaced rail members 165 and 166 on which are mounted for longitudinal movement through the throat 21 sheet gripping shoe assemblies 167 and 168. These shoe assemblies may be allochirally identical in form and the assembly 167 is illustrated in greater detail in FIGS. 8 and 10.

The shoe assembly 167 includes a support body 170 having removable channel member 171 on the inner side thereof surrounding and enclosing the track of rail 165. The channel member may be held in place by socket screws indicated at 172. The body 170 also includes a lower offset portion 173 extending beneath the rail 165 having a tapped port 174 therein in which is secured the rod 175 of elongated piston-cylinder assembly 176. There is, of course, one piston-cylinder assembly for each of the shoe assemblies 167 and 168. Such piston-cylinder assemblies may be mounted in the rear stanchion 163 of the support framing. The offset portion 173 of the body 170 also is provided with a forwardly extending poppet valve 178 which includes a valve member 179 urged by spring 180 surrounding stem 181 to a position closing vent openings 182. The axially movable stem 181 includes a striker head 183 adapted to engage the forward stanchion 164 seen in FIG. 11 which will then move the stem and thus the valve member 179 to an open position venting the passage 184 in the body 170 which is in communication with the poppet vent valve and also the elongated through-bore 185 in the rod 175. Such through-bore passes through the piston 186 and into the chamber of the cylinder assembly at the blind end thereof.

The passage 184 is in communication with rearwardly extending plastic tubing element 188 which is connected at its outer end to a somewhat shorter length of plastic tubing 189 by the U-shape connection 190 secured to the ends of the tubing elements by suitable hose clamps indicated at 191. The shorter tubing length 189 is connected to vacuum cup member 192. The vacuum cup member may comprise a fairly flat plate of machined aluminum having a silicone elastomer fillet secured on top as indicated at 193.

The vacuum cup is provided with a large diameter guide pin 194 fixed therein which projects downwardly through aperture 195 in outwardly offset shelf portion 196 of the body 170. A further guide pin 197 is secured to the body 170 and projects freely through bore 198 in the vacuum cup 192. Tension springs 199 and 200 interconnect the vacuum cup 192 and the body 170 urging the former down. Additional guiding may be obtained by stripping ears 201 which in the lowermost position of the vacuum cup will project above the top surface of the fillet 193.

As seen in FIG. 13, the top surface of the vacuum cup is provided with a dove-tail groove indicated at 203 which secures the corresponding fillet 193 in place. The fillet will have a partition secured in the transverse groove 204 dividing the vacuum shoe into two separate gripping shoes as indicated at 205 and 206. The top surface of each separate shoe is provided with a retriculate pattern of grooves as seen generally at 207 and fluid communication with the tubing 189 is provided through separate passages terminating in the ports 209 and 210. If desired, for the transfer operation, either or both vacuum shoes may be rendered operative depending upon the amount of sheet grip required.

Vertical movement of the vacuum cup with respect to the body 170 is obtained by contact of the lower end of rod 195 with adjustable button 212 at the upper end of screw 213 on operating rod 214. The operating rod is provided with eye 215 which is secured to pin 216 pivoting the rod to the body and it can be seen that as the rod changes its angle with respect to the body, the button 212 will cause the vacuum cup 192 to raise or lower with respect to the body 170.

The opposite end of the rod 214 is also provided with an eye as indicated at 217. As seen more clearly in FIG. 9, pin 218 secured to angles 219 and 220 passes through the eye and such angles are in turn secured to offset links 221 in the chains 125 and 126. A turnbuckle may be provided in the rod 214 to adjust the length thereof, but in any event, the rod and thus the assembly 167 will be driven by the paired chains 125 and 126. The assembly 168 is drivingly connected to the paired chains 127 and 128 by the operating rod 223 in similar manner.

The rod 214 for the shoe assembly 167 is connected to the pair of chains 125 and 126 180° out of phase from the connection of the rod 223 to the pair of chains 127 and 128. In this manner, the shoe assemblies 167 and 168 will reciprocate out of phase along the guide tracks 165 and 166 extending from the retracted position to the extended position illustrated for the shoe assemblies 168 and 167, respectively, in FIG. 2. In such extended position, the shoe assemblies will be in the crotch of wicket 230 of the associated wicket conveyor. Reference may be had to Russell U.S. Pat. No. 2,821,286 for an illustration of such a wicket and wicket conveyor.

The Selsyn 96 driven from the jack shaft 73 seen in FIG. 5 will synchronize the speed of the feed table with that of the wicket conveyor. When in the extended position of the shoe assemblies as seen for the assembly 167 in FIG. 2, the sheet will be released to be picked up by the wicket 230 swinging toward the viewer in FIG. 2. Lateral support cowling indicated at 231 and 232 may provide additional support for the sheets entering the conveyor and also air blast nozzles seen at 233 and 234 operating in timed sequence with the delivery of the sheets may be used actually literally to support the sheets on a blast of air to prevent rubbing of the sheet surfaces over the cowling.

The drive chains on the feed stroke will initially move the proximal ends of the drive rods 214 and 223 up the inclined initial portion 236 seen in FIG. 1 and during such initial movement the speed of the shoes may be synchronized with the speed of the lugs L on the lug chains 40 and 41 controlling the movement of the sheets along the table.

The vertical adjustment of the idle sprockets 130 through 133 controls the angle of inclination of the initial stroke portion 236 and thus the speed of the shoes during the initial feed stroke. The inclined starting chain section 236 permits the vacuum shoe slightly to retard the sheet to allow the lugs L to drop down before the sheet is accelerated. The inclined section 236 moves the shoes no faster than the lugs L and preferably slightly slower. The chains then move the proximal end of the operating rods into the horizontal flight portion 237 which moves the vacuum shoe assemblies at a speed slightly faster than that of the lugs. For example, the shoe assemblies while driven during the horizontal flight 237 may move at approximately 1⅛ the speed of the lugs or approximately 12% faster.

As the proximal ends of the operating rods move through the inclined initial portion 236 of the feed stroke, the angle of such rods with respect to the shoe assembly body 170 will decrease elevating the vacuum shoes 192 against the pressure of the tension springs 199 and 200 moving the shoes up against the sheets so that the shoes actually project slightly above the top planar surface of the feed table. During the horizontal flight portion 237, the angle will remain the same and the shoe assemblies will, of course, remain in their elevated sheet contacting condition.

As the shoe assemblies approach the end of their stroke, the proximal ends of the operating rods will move through the arcuate terminal portion of the feed stroke occasioned by the movement of the chains around the large diameter drive sprockets 121 through 124. This will bring the shoe assemblies to a stop at the end of the tracks 165 and 166 and again will also increase the angle of the operating rod with respect to the shoe assembly body which will lower the shoe assembly for the return stroke clearing the next succeeding sheet.

As the feed stroke commences with the proximal ends of the operating rods progressing up the inclined initial flight 236 and then into the horizontal accelerated speed flight 237, the rods 175 of the piston-cylinder assemblies 176, there being two, one for each shoe assembly, will be caused to extend creating a partial vacuum in the cylinder of the assembly. Since this partial vacuum is connected to the shoe through the hollow rod 175, the vertical passage 184 and the flexible tubing 188, 190 and 189, a vacuum will be created in the shoe which will firmly hold the sheet to the shoe for movement therewith. This vacuum will approach a maximum condition as the shoe approaches the end of its feed stroke thus ensuring positive grip of the sheet during the final deceleration and positive placement in position to be picked up by the wicket. At the end of the stroke, the striker 183 will hit the stanchion 164 opening the poppet valve member 179 venting the vacuum obtained. The diameter of the large drive sprockets 121 through 124, of course, controls the deceleration of the shoe assemblies and the inclination of the initial feed flight of the drive chain may be synchronized with the speed of the sheets to obtain the proper synchronization with the lug chains.

It will be appreciated that the operation of the transfer mechanism may be reversed for the removal of sheets from a wicket conveyor to place the same on a discharge conveyor.

It can now be seen that there is provided a sheet feeding conveyor which drives the belts, the lug chains, and the transfer mechanism from a single drive but at selectively different speeds with the transfer drive being operative initially to move the sheet at a speed higher than that obtained by the lug chains and project the sheet forwardly beyond the end of the feed table stopping the sheet positively positioned and releasing the sheet to be picked up by the wicket of the wicket conveyor.

Other modes of applying the principles of the invention may be employed, change being made as regards the details described, provided the features stated in any of the following claims or the equivalent of such be employed.

We, therefore, particularly point out and distinctly claim as our invention:

1. A sheet feeding conveyor for feeding flat rectangular sheets one at a time comprising a first drive means for continuously moving such sheets therealong, a second intermittent drive means for moving each sheet beyond the end of said conveyor and positively stopping the same, and a common power source for said first and second drive means.

2. A conveyor as set forth in claim 1 wherein said first drive means includes a plurality of sheet supporting drive belts, and means to control the speed of said belts with respect to said second drive means.

3. A sheet feeding conveyor comprising a first drive means for moving such sheet therealong uniformly spaced, and a second drive means for moving each sheet beyond the end of said conveyor and positively stopping the same, said second drive means including a horizontally reciprocating sheet engaging shoe.

4. A conveyor as set forth in claim 3 including means to apply vacuum to said shoe on the feed stroke thereof, such vacuum increasing toward the end of the feed stroke.

5. A sheet feeding conveyor comprising a first drive means for moving such sheet therealong, and a second drive means for moving such sheet beyond the end of said conveyor and positively stopping the same, said second drive means comprising a pair or horizontally reciprocating sheet engaging shoes, said shoes reciprocating 180° out-of-phase.

6. A sheet feeding conveyor for feeding flat rectangular sheets one at a time comprising a first drive means for continuously moving such sheets therealong, a second intermittent drive means for moving each sheet beyond the end of said conveyor and positively stopping the same, and drive chains for said second drive means operative to move such sheet initially at a speed no greater than that obtained by said first drive means and then at a speed faster than that obtained by said first drive means.

7. A sheet feeding conveyor comprising a first drive means for moving such sheet therealong, a second drive means for moving such sheet beyond the end of said conveyor and positively stopping the same, said second drive means comprising two sheet engaging shoes moving back and forth horizontally, means to apply vacuum to said shoes on the feed stroke thereof, and means to vent such vacuum at the end of the feed stroke.

8. A sheet feeding conveyor comprising a first drive means for moving such sheet therealong, a second drive means for moving such sheet beyond the end of said conveyor and positively stopping the same, said second drive means comprising sheet engaging shoes moving horizontally back and forth, and means operative to elevate said shoes on the feed stroke and lower said shoes on the return stroke.

9. A sheet feeding conveyor comprising a first drive means for moving such sheet therealong, a second drive means for moving such sheet beyond the end of said conveyor and positively stopping the same, said second drive means comprising paired drive chains moving through a predetermined path, operating rods connected to said drive chains, and horizontally reciprocable shoes connected to said operating rods and moved by said drive chains.

10. A positive placement conveyor for feeding sheets comprising first means operative to move such sheets therealong, second means operative to move such sheets at a speed higher than that obtained by said first means and positively stop and release such sheets beyond the end of the conveyor, said second means comprising reciprocating sheet engaging shoes, and drive means for said shoes operative to reciprocate the same to and from a position within said conveyor and such position beyond the end of the conveyor.

11. A conveyor as set forth in claim 10 wherein said drive means comprises paired chains, and operating links interconnecting said paired chains and the respective shoes.

12. A conveyor as set forth in claim 11 wherein said drive chains include an inclined initial feed stroke flight portion operative to move such shoes at substantially the speed obtained by said first means, and a horizontal feed stroke flight portion operative to move such sheets at such speed higher than that obtained by said first means.

13. A conveyor as set forth in claim 12 wherein said shoes are mounted on carriages, and means responsive to the angle of the respective operating rod connected to the carriage to change the elevation of the shoe thereon.

14. A conveyor as set forth in claim 13 including a piston-cylinder assembly connected to each carriage operative to create a vacuum in the shoe mounted thereon on the feed stroke thereof.

15. A conveyor as set forth in claim 14 including means operative to vent the vacuum obtained by said piston-cylinder assemblies at the end of the feed stroke.

16. A conveyor as set forth in claim 15 wherein said first means includes a lug chain driven from the same power source as said drive chains operative to position the leading edge of the sheet with respect to said shoes.

17. A conveyor as set forth in claim 16 including large diameter sprockets for said drive chains operative to decelerate said shoes at the end of the feed stroke.

18. A conveyor as set forth in claim 17 wherein each shoe includes a partition dividing such shoe into two vacuum chambers of unequal size.

19. A conveyor as set forth in claim 18 including a fillet of plastic material secured to the top of each shoe.

20. A positive placement conveyor for feeding sheets comprising first means operative to move such sheets therealong, and second means operative to move such sheets at a speed higher than that obtained by said first means and positively stop and release such sheets beyond the end of the conveyor, said first means including positive stop means for positioning the leading edge of the sheet with respect to said second means.

21. The combination set forth in claim 20 wherein said feeding conveyor includes belts for supporting and moving such sheets, and means operative to engage the leading edge of such sheets to synchronize the position of such sheets for said positive placement device and thus said wicket conveyor.

22. The combination set forth in claim 21 wherein said means operative to engage the leading edge of such sheets comprises lugs projecting from a chain driven in synchronism with said positive placement device.

23. In combination, a wicket conveyor for delivering sheets through a furnace and the like, and a feeding conveyor for said wicket conveyor operative to deposit such sheets one at a time in said wicket conveyor, said feeding conveyor including a drive means operative to move each sheet therealong uniformly spaced, and a positive placement device operated in synchronism with said drive means operative to transfer each sheet to said wicket conveyor to be picked up by the latter.

24. In combination, a wicket conveyor for delivering sheets through a furnace and the like, and a feeding conveyor for said wicket conveyor operative to deposit such sheets one at a time in said wicket conveyor, said feeding conveyor including a positive placement device operative to transfer such sheets to said wicket conveyor to be picked up by the latter, said positive placement device comprising suction shoes reciprocating back and forth at the discharge end of said feeding conveyor.

25. The combination set forth in claim 24 including means to obtain vacuum in said shoes on the feed stroke only, such vacuum increasing toward the end of the feed stroke.

26. The combination set forth in claim 25 wherein such vacuum is obtained by piston-cylinder assemblies having hollow rods, the latter being connected to said shoes for movement therewith.

27. The combination set forth in claim 26 including drive means for said shoes reciprocating said shoes 180° out-of-phase.

28. The combination set forth in claim 27 wherein said drive means comprises paired drive chains interconnected to said shoes by operating rods.

29. The combination set forth in claim 28 wherein said drive chains include a feed flight and a return flight with the feed flight including an initial inclined portion operative to move the shoes at substantially the speed of a sheet on said feeding conveyor and a horizontal portion operative to move the shoes at a speed substantially higher than the speed of the sheet on said feeding conveyor.

30. The combination set forth in claim 29 including large diameter sprockets at one end of said drive chains operative to decelerate said shoes and stop the same at the end of the feed stroke.

31. The combination set forth in claim 30 including a carriage for each shoe, the operating rod therefor being connected to said carriage, and means responsive to changes in the angle of the operating rod with respect to said carriage operative to raise and lower the shoe on the carriage.

References Cited

UNITED STATES PATENTS

| | | |
|---|---|---|
| 930,673 | 8/1909 | Manischewitz. |
| 1,428,716 | 9/1922 | Smith. |
| 2,880,846 | 4/1959 | Schone _____ 198—134 X |
| 2,954,863 | 10/1960 | Staples _____ 198—106 X |
| 3,218,069 | 11/1965 | Halberschmidt _____ 271—69 |

EDWARD A. SROKA, Primary Examiner

U.S. Cl. X.R.

198—106; 271—69